(12) United States Patent
Kuck et al.

(10) Patent No.: US 11,913,825 B2
(45) Date of Patent: Feb. 27, 2024

(54) STORAGE SYSTEM FOR A LOADING SPACE OF A COMMERCIAL MOTOR VEHICLE AND METHOD FOR MONITORING A PIECE NUMBER AND/OR A VOLUME OF A COMMODITY LOCATED IN A RECEIVING UNIT IN A COMMERCIAL MOTOR VEHICLE

(71) Applicant: Ford Global Technologies, LLC, Dearborn, MI (US)

(72) Inventors: Detlef Kuck, Inden (DE); Marcel Grein, Geilenkirchen (DE); Alexandra Holz, Aachen (DE); Moritz Martinius, Cologne (DE); Ramola Rege, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 17/383,105

(22) Filed: Jul. 22, 2021

(65) Prior Publication Data

US 2022/0034705 A1 Feb. 3, 2022

(30) Foreign Application Priority Data

Jul. 29, 2020 (DE) .................. 102020209530.2

(51) Int. Cl.
*G01G 19/414* (2006.01)
*B60P 3/22* (2006.01)
(Continued)

(52) U.S. Cl.
CPC .......... *G01G 19/4144* (2013.01); *B60P 3/228* (2013.01); *G01G 19/08* (2013.01); *G01G 19/52* (2013.01); *G01G 23/3735* (2013.01)

(58) Field of Classification Search
CPC .. G01G 19/08; G01G 19/414; G01G 19/4144; G01G 19/52; G01G 23/3735; B60P 3/228
See application file for complete search history.

(56) References Cited

U.S. PATENT DOCUMENTS 3,321,035 A * 5/1967 Tarpley .................. G01G 19/12
177/136
3,826,319 A * 7/1974 Loshbough ............ G01G 23/46
177/25.15

(Continued)

FOREIGN PATENT DOCUMENTS

DE 102011080245 A1 2/2013
DE 102018117352 A1 1/2020

OTHER PUBLICATIONS

"What is E-Paper Display Technology & How Does It Work?" at <https://www.ynvisible.com/news-inspiration/what-is-e-paper>, copyrighted 2021.*

*Primary Examiner* — Randy W Gibson
(74) *Attorney, Agent, or Firm* — Brandon Hicks; Eversheds Sutherland (US) LLP

(57) ABSTRACT

The invention relates to a storage system (1) for a loading space of a commercial motor vehicle. In order to make commercial motor vehicles available that can be utilized more productively and more effectively, the storage system (1) exhibits at least one weighing machine with counting scale (5), capable of being fixed in the loading space, and at least one indicating unit (7), assigned to the weighing machine with counting scale (5), for indicating a piece number of bulk commodity located on the weighing machine with counting scale (5) and/or for indicating a volume of a liquid commodity located on the weighing machine with counting scale (5).

17 Claims, 6 Drawing Sheets

(51) Int. Cl.
G01G 19/08 (2006.01)
G01G 19/52 (2006.01)
G01G 23/37 (2006.01)

(56) References Cited

U.S. PATENT DOCUMENTS

| | | | | |
|---|---|---|---|---|
| 4,722,456 | A * | 2/1988 | Laidlaw | G01G 23/00 |
| | | | | 222/77 |
| 5,736,939 | A * | 4/1998 | Corcoran | B60T 8/172 |
| | | | | 340/905 |
| 5,884,238 | A * | 3/1999 | Noll | B60P 1/00 |
| | | | | 177/4 |
| 5,929,388 | A | 7/1999 | Uehara et al. | |
| 6,384,349 | B1 * | 5/2002 | Voll | G01G 19/10 |
| | | | | 177/137 |
| 7,518,068 | B2 * | 4/2009 | Green | G01G 21/22 |
| | | | | 177/144 |
| 7,735,365 | B2 * | 6/2010 | Crain | G01G 17/04 |
| | | | | 73/296 |
| 10,132,674 | B2 | 11/2018 | Watanabe | |
| 10,479,418 | B1 | 11/2019 | Patel et al. | |
| 10,853,761 | B1 * | 12/2020 | Bentley | G01G 19/42 |
| 2018/0180462 | A1 * | 6/2018 | Kiehn | A61J 3/074 |
| 2018/0292253 | A1 * | 10/2018 | Düppre | G01G 19/03 |
| 2019/0220829 | A1 * | 7/2019 | Ripley | G06Q 10/30 |
| 2021/0035192 | A1 * | 2/2021 | McBrady | G06Q 10/087 |

* cited by examiner

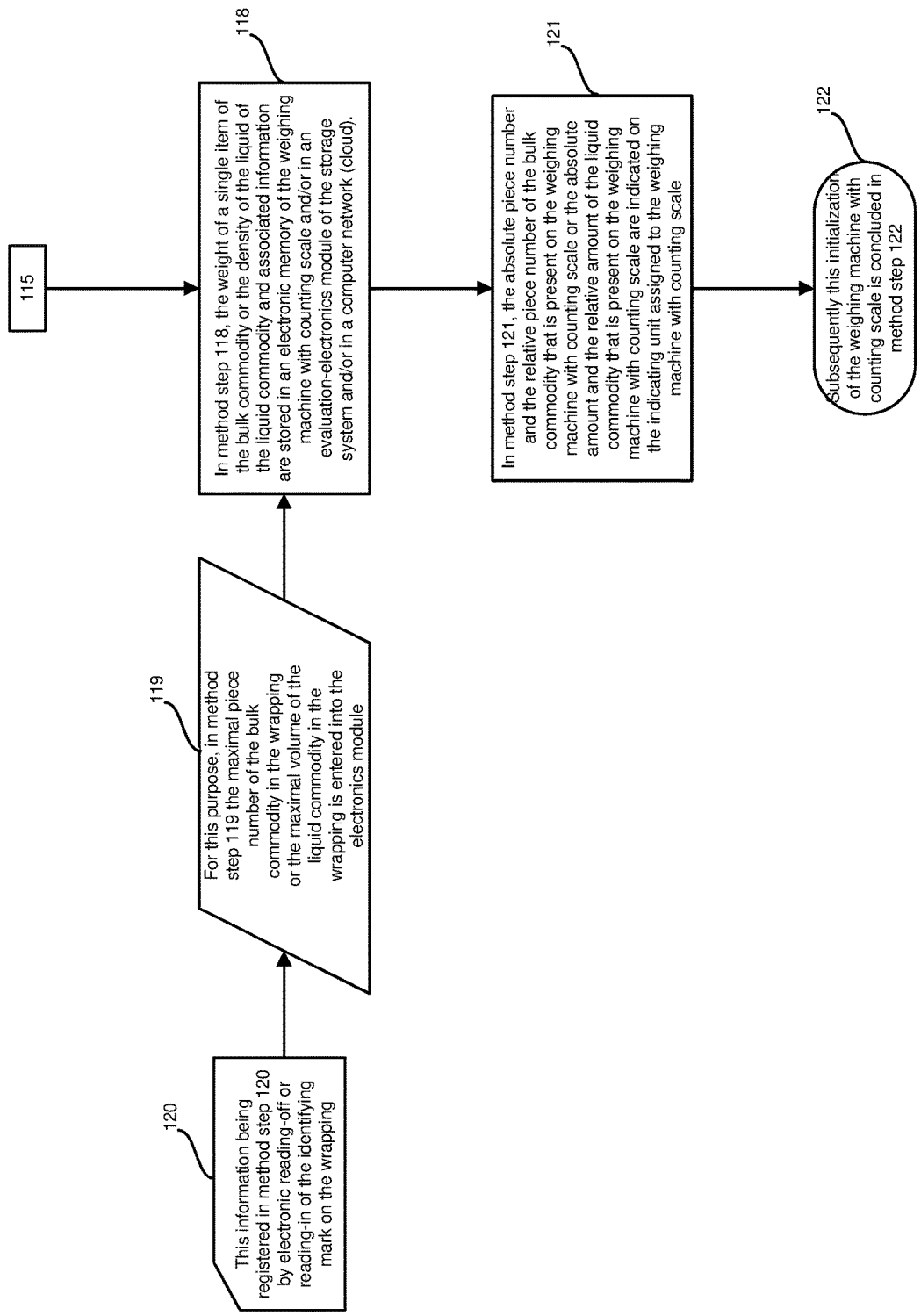
Fig. 2 (Further Continued)

STORAGE SYSTEM FOR A LOADING SPACE OF A COMMERCIAL MOTOR VEHICLE AND METHOD FOR MONITORING A PIECE NUMBER AND/OR A VOLUME OF A COMMODITY LOCATED IN A RECEIVING UNIT IN A COMMERCIAL MOTOR VEHICLE

CROSS-REFERENCE TO RELATED APPLICATIONS

The disclosure claims priority to and the benefit of German Application No. 102020209530.2, filed Jul. 29, 2020, which is hereby incorporated by reference herein in its entirety.

FIELD

The invention relates to a storage system for a loading space of a commercial motor vehicle. In addition, the invention relates to a method for monitoring a piece number of a bulk commodity located in a receiving unit and/or for monitoring a volume of a liquid commodity located in a receiving unit in a loading space of a commercial motor vehicle.

BACKGROUND

Organizing a loading space of a commercial motor vehicle—in particular, a delivery truck or installation truck—conventionally requires a considerable expenditure of time and considerable effort. Delivery drivers and mechanics have to load their commercial motor vehicles themselves carefully in accordance with their individual delivery route, in order to retain an overview of the loading of their commercial motor vehicle.

In addition to a given quantity of the commodities in the loading space, information relating to the availability or non-availability of the commodities in the loading space is important, particularly for consumable commodities such as nails or liquids, for instance.

U.S. Pat. No. 10,132,674 B2 discloses a loading-weight-registering apparatus with a touch-screen which receives the input of a vehicle-body weight and an initial setting of a freight weight, and with an oscillation-registering component which registers an oscillation of a freight vehicle. Moreover, the apparatus exhibits an arithmetic component which acts as a means for identifying natural oscillations, in order to be able to identify natural oscillations in the dead-weight direction as a natural-oscillation value—specific to the center of gravity of vertical oscillation—on the basis of oscillation data which are registered by an oscillation-registering component. In addition, the apparatus exhibits a memory component which stores a natural-oscillation value—specific to the center of gravity of vertical oscillation—identified by the arithmetic component. The arithmetic component calculates the total weight on the basis of the identified center of gravity of the center of gravity of vertical oscillation and initial setting data.

U.S. Pat. No. 5,929,388 A discloses a vehicle-load-measuring apparatus with load sensors which are fastened to vehicle-weight-bearing vehicle components and which output signals that are decisive for the weight, with a load-information control device with a load-information-calculation section for the arithmetical calculation of the load information of the vehicle on the basis of the output signals registered by the load sensors, and with a load-information-storage section for storing the load information calculated arithmetically in the load-information-calculation section. The stored load information is output by the load-information control device. In addition, the apparatus exhibits a vehicle-status-information-registering unit for registering status information for the vehicle. The load-information control device updates data in the load-information-storage section if the vehicle status registered by the vehicle-status-information-registering unit assumes a predetermined status.

DE 10 2011 080 245 A1 discloses a method for monitoring an additional load on a loading area of a vehicle. An item of additional-load information about the additional load on the loading area is ascertained by means of at least one weight signal, said weight signal representing a signal of a weight sensor arranged on the loading area.

DE 10 2018 117 352 A1 discloses a commercial vehicle with a structure for loading cargo and with a vehicle main frame on which a plurality of weight-measuring sensors have been pre-installed and arranged in distributed manner for the purpose of measuring the weight of varying sections of the structure, the structure having been mounted retrospectively onto the main frame of the vehicle with the pre-installed plurality of weight-measuring sensors. In addition, the vehicle exhibits an indicating device for indicating loading states, ascertained by weight measurements performed by the plurality of weight-measuring sensors, of the varying sections of the structure and/or for indicating a load center of gravity, ascertained by weight measurements performed by the plurality of weight-measuring sensors, of a loading of the structure, and/or for indicating axle loads of the commercial vehicle, ascertained by weight measurements performed by the plurality of weight-measuring sensors.

U.S. Pat. No. 10,479,418 B1 discloses a system for delivering a requested payload by using an autonomous delivery vehicle. A loading system for use with an autonomous delivery vehicle exhibits a frame which defines a loading space with an opening. Several partitions can be positioned and configured within the loading space, in order to subdivide the loading space into compartments. The partitions may be movable, so that the loading space can be subdivided into efficiently dimensioned compartments. The loading system may further exhibit an access system which has been configured to define selectively an opening above the opening of the loading space. The access system can vary the size and position of the opening, in order to obtain access only to a selected one of the pigeonholes, irrespective of the size and/or position of the selected pigeonhole.

SUMMARY

The object underlying the invention is to make commercial motor vehicles available that can be utilized more productively and more effectively.

In accordance with the invention, the object is achieved by a storage system with the features of claim 1, which exhibits at least one weighing machine with counting scale, capable of being fixed in the loading space, and at least one indicating unit, assigned to the weighing machine with counting scale, for indicating a piece number of a bulk commodity located on the weighing machine with counting scale and/or for indicating a volume of a liquid commodity located on the weighing machine with counting scale.

Attention should be drawn to the fact that the features and measures listed individually in the following description may be combined with one another in any technically meaningful manner and demonstrate further configurations of the invention. The description characterizes and specifies the invention additionally, particularly in connection with the figures.

In accordance with the invention, an item of information relating to the given quantity of the bulk commodity or liquid commodity in the loading space or an item of information relating to the availability or non-availability of the commodity in the loading space can be made available to a user of the commercial motor vehicle by means of the weighing machine with counting scale and by means of the indicating unit. Prior to each utilization of the commercial motor vehicle the user does not have to make for himself/herself an image of the quantity or existence of a commodity in the loading space, this being associated, particularly in the case of a plurality of different commodities in the loading space, with a distinct saving of time if an appropriate weighing machine with counting scale and an appropriate indicating unit are present for each commodity.

The weighing machine with counting scale can be fixed in the loading space, in order to be secured against slipping during a journey of the commercial motor vehicle. By this means, the commodity arranged on the weighing machine with counting scale may also have been secured against slipping. For the purpose of measuring the quantity of the commodity, the weighing machine with counting scale may, for instance, exhibit at least one strain gage.

The indicating unit may exhibit at least one alphanumeric display, in order to be able to indicate the piece number of the bulk commodity located on the weighing machine with counting scale and/or the volume of the liquid commodity located on the weighing machine with counting scale—specifically, for instance, as an absolute value and/or as a relative value, in particular in the form of a percentage indication or such like. The alphanumeric display may, for instance, take the form of a liquid-crystal display.

By the term "bulk commodity", a solid transportable commodity is to be understood. The bulk commodity may be, for instance, a consumable commodity which is consumed irreversibly through its use or application. The bulk commodity may, for instance, serve for the mechanical connection of structural parts and may in this regard take the form of, for instance, a nail, screw, nut, washer or such like.

By the term "liquid commodity", a liquid transportable commodity is to be understood. The liquid commodity may be, for instance, a consumable commodity which is consumed irreversibly through its use or application. The liquid commodity may be, for instance, an oil, a diluent, a liquefied gas or another liquid.

The commercial motor vehicle may be, in particular, an installation vehicle in which a mechanic carries various tools and installation means, the installation means taking the form of a bulk commodity or liquid commodity. The loading space is be, for instance, a rear loading space, as is sufficiently well-known from various transport trucks. Alternatively, the commercial motor vehicle may be a delivery truck.

The weighing machine with counting scale can be initialized for the respective commodity. For this purpose, an identification marking—for instance, an RFID transponder, a barcode, a QR code, a BLE transponder or such like—can be read out or read off by means of a reading instrument—for instance, a scanner—which is fixed to a wrapping of the commodity. By this means, an item of information can be registered relating to the weight of the wrapping, to the weight of a single item of the bulk commodity or to a density of the liquid of the liquid commodity and to a maximal piece number of the bulk commodity in the wrapping or to a maximal volume of the liquid commodity in the wrapping. This information can be stored in an electronic memory of the weighing machine with counting scale.

Instead of this, a particular piece number of the bulk commodity or a particular volume of the liquid commodity can be measured, and subsequently the measured piece number or the measured volume, the weight of the wrapping and the maximal piece number of the bulk commodity in the wrapping or the maximal volume of the liquid commodity in the wrapping can be entered manually and stored in the electronic memory of the weighing machine with counting scale.

Alternatively, information about the weight of the wrapping, the weight of a single item of the bulk commodity or the density of the liquid of the liquid commodity and the maximal piece number of the bulk commodity in the wrapping or the maximal volume of the liquid commodity in the wrapping can be obtained from an external source—for instance, a data cloud—and stored in the electronic memory of the weighing machine with counting scale.

After initialization of the weighing machine with counting scale has taken place, said machine can be employed for the purpose of carrying out the desired measurements. In the course of such a measurement, the weight of the commodity together with the weight of the wrapping, for instance, can be measured as gross weight. Alternatively, the absolute piece number and/or the relative piece number of the bulk commodity or the volume of the liquid commodity can be ascertained from a weight of the wrapping, from the weight of an item of the bulk commodity or from the density of the liquid of the liquid commodity and from the maximal piece number of the bulk commodity or the maximal volume of the liquid commodity. In addition or alternatively, the item of information can be indicated on the indicating unit and/or communicated to a computer network (cloud), in order to make this information accessible for further appliances.

According to an advantageous configuration, the storage system exhibits at least one shelf which is capable of being fixed in the loading space and on which the weighing machine with counting scale is capable of being fixed, the indicating unit being arranged in the region of the weighing machine with counting scale on the shelf. The shelf may, for instance, be a structural part of a rack which is arranged within the loading space. Such a rack may be designated as a smart rack. The shelf may, for instance, have been produced from a metal, a metal alloy, from a synthetic material, a composite material, or from wood. By virtue of the arrangement of the indicating unit on the shelf in the region of the weighing machine with counting scale, the indicating unit is capable of being assigned visually to the weighing machine with counting scale in straightforward manner, which is an advantage, particularly in the case of several weighing machines with counting scale arranged on the shelf. In order to improve, to make more accurate, the measurement that is capable of being carried out with the weighing machine with counting scale, the storage system may exhibit at least one passive oscillation-damping element—for instance, an elastomeric body—via which the shelf is capable of being connected to the commercial motor vehicle. Alternatively or in addition, the storage system may exhibit at least one passive oscillation-damping element via which the weighing machine with counting scale has been connected to the shelf. By this means, the transmission of oscillations from the commercial motor vehicle to the weighing machine with counting scale can be damped.

Another advantageous configuration provides that the indicating unit takes the form of an e-paper display. Such an indicating unit displays a relatively low consumption of electrical energy. In addition, the indication of an e-paper display may be invariable, so that no electrical energy is consumed for the purpose of indicating. This has the advantage that the last state of the information on the e-paper display is capable of being read off even in the event of a failure of the power supply—for instance, as a result of disconnection for energy-saving reasons or as a result of a defect. The e-paper display may be illuminated from a front side of the e-paper display, for instance via a foil which has been stuck onto the e-paper display.

According to another advantageous configuration, the storage system exhibits at least two weighing machines with counting scale, capable of being fixed in the loading space, and at least one central indicating unit which has been set up to indicate, for all the weighing machines with counting scale, in the given case the piece number of the bulk commodity located on the respective weighing machine with counting scale and/or the volume of the liquid commodity located on the respective weighing machine with counting scale. Via the central indicating unit, a user of the storage system can view the quantities of all the available bulk commodities and/or liquid commodities. For this purpose, all these commodities and the respective quantity thereof can be listed on the central indicating unit. The central indicating unit may exhibit at least one alphanumeric display. The central indicating unit may, for instance, take the form of a touch-screen.

According to another advantageous configuration, the storage system exhibits at least one evaluation-electronics module, connected to the weighing machine(s) with counting scale, on the one hand, and to the central indicating unit, on the other hand, which has been set up to drive the central indicating unit for the purpose of indicating an information signal assigned to a particular weighing machine with counting scale if by means of this weighing machine with counting scale it has been registered that the piece number of the bulk commodity or the volume of the liquid commodity on this weighing machine with counting scale falls short of a predetermined minimum value. By this means, the attention of a user of the storage system can be drawn in good time to the fact that, through consumption or carelessness, at least one particular commodity has not been stored in the storage system in a sufficient piece number or amount. As a result, the user can replenish the corresponding commodity prior to the next utilization of the commercial motor vehicle, in order not to have to discover, on site later in the course of an installation job, that commodities required for this job are not present in the commercial motor vehicle. In addition, a corresponding information signal can also be indicated by the indicating unit on the shelf that has been assigned to the weighing machine with counting scale. The drive electronics may have been set up to perform an active correction of a measured value pertaining to the weighing machine with counting scale by using a measured value pertaining to another weighing machine with counting scale, on which no commodity has been placed and which is preferentially of identical construction to the first weighing machine with counting scale.

Another advantageous configuration provides that the storage system exhibits at least one microphone, connected to the drive electronics, for entering voice commands, the drive electronics having been set up to evaluate the voice commands and to drive the indicating unit assigned to the respective weighing machine with counting scale and/or the central indicating unit as a function of voice commands. By this means, a user of the storage system can selectively enquire about particular commodities and the quantity thereof, without the user having to perform elaborate inputs into the system for this purpose. The drive electronics may, in addition, have been set up to drive the indicating unit that has been assigned to the weighing machine with counting scale with which the commodity demanded by the user is capable of being measured, in such a manner that this indicating unit outputs a visual signal which indicates to the user the exact location of the demanded commodity. In addition, alphanumeric information relating to the demanded commodity can be indicated on the central indicating unit.

According to another advantageous configuration, the storage system exhibits at least one data interface, connected to the drive electronics, for wireless communication with a data network. By this means, information relating to the storage system can be transmitted to a computer network (cloud) via the data network, in order to be able to process this information and distribute it to further storage systems. Alternatively, a communication of data via a bus system (CAN, Ethernet, etc.) of the commercial motor vehicle may take place, for which purpose the storage system may exhibit at least one data interface connected to the drive electronics.

According to another advantageous configuration, at least one weighing machine with counting scale exhibits an electronics module which has been set up to receive and evaluate an item of information relating to an instantaneous travel speed of the commercial motor vehicle, so that a measurement by means of the weighing machine with counting scale is undertaken only when the commercial motor vehicle has been at a standstill for longer than a period of time of predetermined length. This is an advantage, since during a journey of the commercial motor vehicle excessive oscillations act, as a rule, on the weighing machine with counting scale, and a liquid commodity is in intense motion, rendering an accurate measurement of the quantity of the respective commodity impossible. The information relating to the instantaneous travel speed of the commercial motor vehicle can, for instance, be acquired by means of a global navigation-satellite system—for instance, via a GPS receiver—and/or by means of a wheel sensor of the commercial motor vehicle. Up until the next measurement of the quantity of the respective commodity, the indicating unit assigned to the respective weighing machine with counting scale indicates the result of the last measurement of the quantity of the commodity. This result of the last measurement of the quantity of the commodity can be transmitted to a computer network via the aforementioned interface. The predetermined length of the standstill period may amount to 60 seconds, for instance. The predetermined length of the standstill period may, in particular, be selected with due regard for natural oscillations, to be expected, of the liquid commodity, these depending, in turn, on the viscosity of the respective liquid commodity. For water or for a liquid commodity having the viscosity of water, a predetermined length of 60 seconds is a good value, in which case after expiration of this standstill period an accurate weight measurement with the weighing machine with counting scale is possible. In addition, a predetermined length of the standstill period at the level of 60 seconds is a good mean value, since a liquid commodity having higher viscosity—such as an oil or a paint, for instance—displays a shorter period of natural oscillation, whereas a liquid commodity having lower viscosity—such as gasoline, for instance—displays a longer period of natural oscillation. The electronics module of the weighing machine with counting scale may have been set up to smooth the measured value (weight)—for instance, by calculation of a sliding (temporal) mean value of the weight—for active improvement of the measurement by means of the weighing machine with counting scale. After such a smoothing, an initial value has significantly smaller discontinuities and should be sufficient as a basis of the measurement by means of the weighing machine with counting scale. The electronics module may have been set up to perform an active correction of the measured value pertaining to the weighing machine with counting scale by using a measured value pertaining to a further weighing machine with counting scale, on which no commodity has been placed and which is preferentially of identical construction to the first weighing machine with counting scale. In this connection, the electronics module may have been set up to carry out the correction by a subtraction of the measured value pertaining to the further weighing machine with counting scale from the measured value pertaining to the first weighing machine with counting scale.

Another advantageous configuration provides that the storage system exhibits at least one triaxial gyroscope which is capable of being fixed to the shelf and which is connected to the electronics module of the weighing machine with counting scale, the electronics module having been set up to evaluate measurement signals of the gyroscope, so that the measurement by means of the weighing machine with counting scale is undertaken only when amplitudes of oscillations of the shelf are smaller than a predetermined amplitude. By means of the gyroscope, oscillations of the shelf can be registered very exactly. If the amplitudes of these oscillations attain the predetermined amplitude, an exact measurement of the quantity of the respective commodity by means of the weighing machine with counting scale is no longer possible. The next measurement of the quantity of the commodity is postponed until the amplitudes of the oscillations of the shelf are smaller than the predetermined amplitude. Up until the next measurement of the quantity of the respective commodity, the indicating unit assigned to the respective weighing machine with counting scale indicates the result of the last measurement of the quantity of the commodity. This result of the last measurement of the quantity of the commodity can be transmitted to a computer network via the aforementioned interface.

According to another advantageous configuration, the electronics module has been set up to correct a result of the measurement by means of the weighing machine with counting scale as a function of a state of inclination of the shelf, registered by means of the gyroscope. Since weighing machines with counting scale are able to measure the weight of the respective commodity exactly exclusively in horizontal orientation, in the case of a shelf inclined relative to the horizontal an erroneous measurement of the weight of the respective commodity occurs. By means of the gyroscope, the respective state of inclination of the shelf can be taken into consideration, in order to be able to correct the result of the measurement of the quantity of the respective commodity. For this purpose, an appropriate algorithm can be executed by means of the electronics module of the weighing machine with counting scale.

According to an advantageous configuration, the storage system exhibits at least one bulk-commodity-receiving and/or liquid-commodity-receiving unit which is capable of being arranged on the weighing machine with counting scale. The receiving unit may, for instance, take the form of a tray for bulk commodity. Alternatively, the receiving unit may take the form of a container for liquid commodity.

The above object is achieved, in addition, by a commercial motor vehicle that exhibits at least one storage system, arranged in the loading space, according to one of the aforementioned configurations or according to a combination of at least two of these configurations with one another. The advantages stated above with reference to the storage system are correspondingly associated with the commercial motor vehicle.

The above object is achieved, furthermore, by a method with the features of claim 12, according to which the piece number of the bulk commodity or the volume of the liquid commodity is registered by means of a weighing machine with counting scale, fixed in the loading space, and is indicated by means of an indicating unit assigned to the weighing machine with counting scale.

The advantages stated above with reference to the storage system are correspondingly associated with the method. In particular, the storage system according to one of the aforementioned configurations or according to a combination of at least two of these configurations with one another can be employed for the purpose of carrying out the method. In this connection, the storage system accordingly serves for monitoring the piece number of the bulk commodity located in the receiving unit and/or for monitoring the volume of the liquid commodity located in the receiving unit in the loading space of the commercial motor vehicle.

According to an advantageous configuration, the piece number of the bulk commodity or the volume of the liquid commodity is indicated additionally by means of a central indicating unit, by means of which piece numbers of bulk commodities and/or volumes of liquid commodities are indicated simultaneously for several weighing machines with counting scale. The advantages stated above with reference to the corresponding configuration of the storage system are correspondingly associated with this configuration.

Another advantageous configuration provides that an information signal assigned to a particular weighing machine with counting scale is indicated by means of the indicating unit and/or the central indicating unit if by means of this weighing machine with counting scale it has been registered that the piece number of the bulk commodity or the volume of the liquid commodity on this weighing machine with counting scale falls short of a predetermined minimum value. The advantages stated above with reference to the corresponding configuration of the storage system are correspondingly associated with this configuration.

According to another advantageous configuration, the indicating unit assigned to the respective weighing machine with counting scale and/or the central indicating unit is/are driven as a function of voice commands. The advantages stated above with reference to the corresponding configuration of the storage system are correspondingly associated with this configuration.

According to another advantageous configuration, results of measurements by means of the weighing machines with counting scale are communicated to a computer network in wireless manner via a data network. The advantages stated above with reference to the corresponding configuration of the storage system are correspondingly associated with this configuration. Alternatively, a communication of data can take place via a bus system (CAN, Ethernet, etc.) of the commercial motor vehicle.

Another advantageous configuration provides that the measurement by means of the weighing machine with counting scale is undertaken only when sensor means register that the commercial motor vehicle has been at a standstill for longer than a period of time of predetermined length. The advantages stated above with reference to the corresponding configuration of the storage system are correspondingly associated with this configuration.

For active improvement of the measurement by means of the weighing machine with counting scale, the measured value (weight) can be smoothed, for instance by calculation of a sliding (temporal) mean value of the weight. After such a smoothing, an initial value has significantly smaller discontinuities and should be sufficient as a basis of the measurement by means of the weighing machine with counting scale. An active correction of the measured value pertaining to the weighing machine with counting scale can be carried out by using a measured value pertaining to a further weighing machine with counting scale, on which no commodity has been placed and which is preferentially of identical construction to the first weighing machine with counting scale. In this connection, the correction can be carried out by a subtraction of the measured value pertaining to the further weighing machine with counting scale from the measured value pertaining to the first weighing machine with counting scale.

According to another advantageous configuration, the measurement by means of the weighing machine with counting scale is undertaken only when sensor means register that amplitudes of oscillations of a shelf bearing the weighing machine with counting scale are smaller than a predetermined amplitude. The advantages stated above with reference to the corresponding configuration of the storage system are correspondingly associated with this configuration.

According to another advantageous configuration, a result of the measurement by means of the weighing machine with counting scale is corrected as a function of a state of inclination of the shelf, registered by sensor means. The advantages stated above with reference to the corresponding configuration of the storage system are correspondingly associated with this configuration.

BRIEF DESCRIPTION OF THE DRAWINGS

Further advantageous configurations of the invention are disclosed in the dependent claims and in the following description of the figures. Shown are:

DETAILED DESCRIPTION

Figure 1:
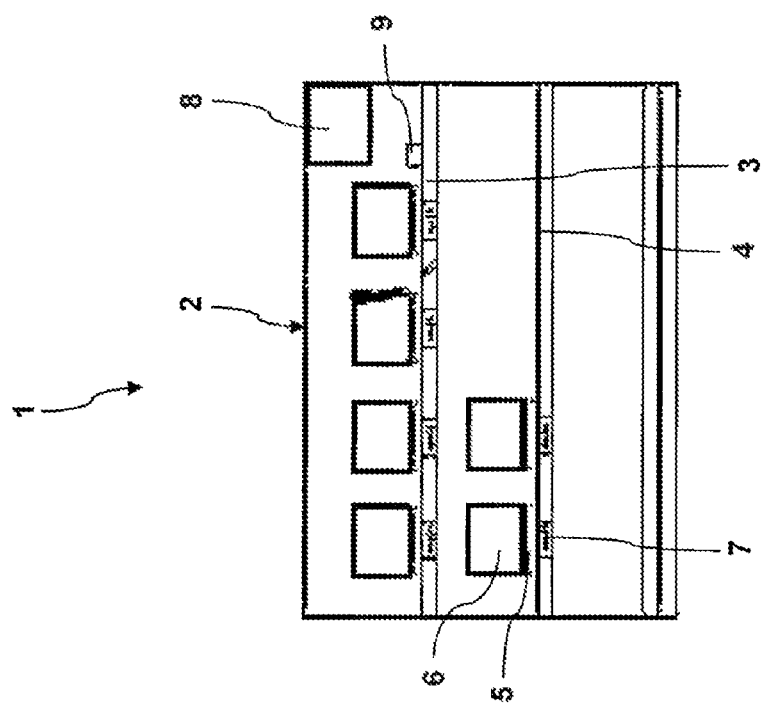
FIG. 1 a schematic representation of an embodiment of a storage system according to the invention, FIG. 2 a flowchart of an example of an initialization of a weighing machine with counting scale according to the invention and FIG. 3 a flowchart of an example of a measurement by means of a weighing machine with counting scale according to the invention.

FIG. 1 shows a schematic representation of an embodiment of a storage system 1 according to the invention for a loading space, not shown, of a commercial motor vehicle, not shown. The systems and methods disclosed herein may be, in some instances, executed by one or more controllers comprising memory and processor(s).

The storage system 1 exhibits a rack 2, fixed in the loading space, with two shelves 3 and 4 arranged in spaced manner one above the other. Four weighing machines with counting scale 5 are fixed on shelf 3, and two weighing machines with counting scale 5 are fixed on shelf 4. The weighing machines with counting scale 5 have accordingly been fixed in the loading space via the rack 2. On each weighing machine with counting scale 5 a bulk-commodity-receiving and/or liquid-commodity-receiving unit 6 is arranged, in which, in the given case, various bulk commodities and/or liquid commodities, not shown, have been received.

A separate indicating unit 7 for indicating a piece number of a bulk commodity located on the respective weighing machine with counting scale 5 and/or for indicating a volume of a liquid commodity located on the respective weighing machine with counting scale 5 has been assigned to each weighing machine with counting scale 5. The respective indicating unit 7 is arranged frontally on the respective shelf 3 or 4 in the region of the weighing machine with counting scale 5 assigned thereto. The respective indicating unit 7 may take the form of an e-paper display.

Over and above this, the storage system 1 exhibits a central indicating unit 8 which, in the embodiment, is arranged at a right upper corner—in the plane of the drawing—of the rack 2 and has been set up to indicate, for all the weighing machines with counting scale 5, in the given case the piece number of the bulk commodity located on the respective weighing machine with counting scale 5 and/or the volume of the liquid commodity located on the respective weighing machine with counting scale 5.

In addition, the storage system 1 exhibits an evaluation-electronics module, not shown, connected to the weighing machines with counting scale 5, on the one hand, and to the central indicating unit 8, on the other hand, which has been set up to drive the central indicating unit 8 for the purpose of indicating an information signal assigned to a particular weighing machine with counting scale 5 if by means of this weighing machine with counting scale 5 it has been registered that the piece number of the bulk commodity or the volume of the liquid commodity on this weighing machine with counting scale 5 falls short of a predetermined minimum value.

Moreover, the storage system 1 exhibits a microphone, not shown, connected to the drive electronics, for entering voice commands, the drive electronics having been set up to evaluate the voice commands and to drive the indicating unit 7 assigned to the respective weighing machine with counting scale 5 and/or the central indicating unit 8 as a function of voice commands.

The storage system 1 exhibits a data interface, not shown, connected to the drive electronics, for wireless communication with a data network.

At least one weighing machine with counting scale 5 exhibits an electronics module, not shown, which has been set up to receive and evaluate an item of information relating to an instantaneous travel speed of the commercial motor vehicle, so that a measurement by means of the weighing machine with counting scale 5 is undertaken only when the commercial motor vehicle has been at a standstill for longer than a period of time of predetermined length. The ascertainment of whether or not the commercial motor vehicle has been at a standstill for longer than a period of time of predetermined length can be undertaken by means of an electronics module of the commercial motor vehicle, by means of the drive electronics, or by means of the electronics module of the respective weighing machine with counting scale 5. For this purpose, the electronics module of the commercial motor vehicle may use, for instance, at least one wheel sensor, a position-finding system, an acceleration sensor or such like. However, MEMS acceleration sensors may also simply have been integrated within the drive electronics or within the individual weighing machines with counting scale 5 themselves. In this connection, it is a question of inexpensive microchips that are able to measure the acceleration in all three axes of space. A standstill can be ascertained by this means if merely the gravitational acceleration G can be measured within a certain plausibility range (of the axes of space) and otherwise there is no acceleration. In addition, an item of information about the inclination of the weighing machine with counting scale 5 and/or of the drive electronics and/or of the commercial motor vehicle can also be acquired via the angle of the actual gravitational-acceleration vector with respect to the vertical Z-axis.

The storage system 1 exhibits, in addition, a triaxial gyroscope 9 which is capable of being fixed to shelf 3 and which is connected to the electronics module of the respective weighing machine with counting scale 5, the electronics module having been set up to evaluate measurement signals of the gyroscope 9, so that the measurement by means of the weighing machine with counting scale 5 is undertaken only when amplitudes of oscillations of shelf 3 are smaller than a predetermined amplitude. Alternatively, this functionality can be assumed by the evaluation-electronics module, which for this purpose may have been set up to initiate or to enable the measurements if amplitudes of oscillations of shelf 3 are smaller than a predetermined amplitude.

The electronics module of the respective weighing machine with counting scale 5 has, in addition, been set up to correct a result of the measurement by means of the weighing machine with counting scale 5 as a function of a state of inclination of shelf 3, registered by means of the gyroscope 9. Alternatively, this functionality can be assumed by the evaluation-electronics module.

Figure 2:
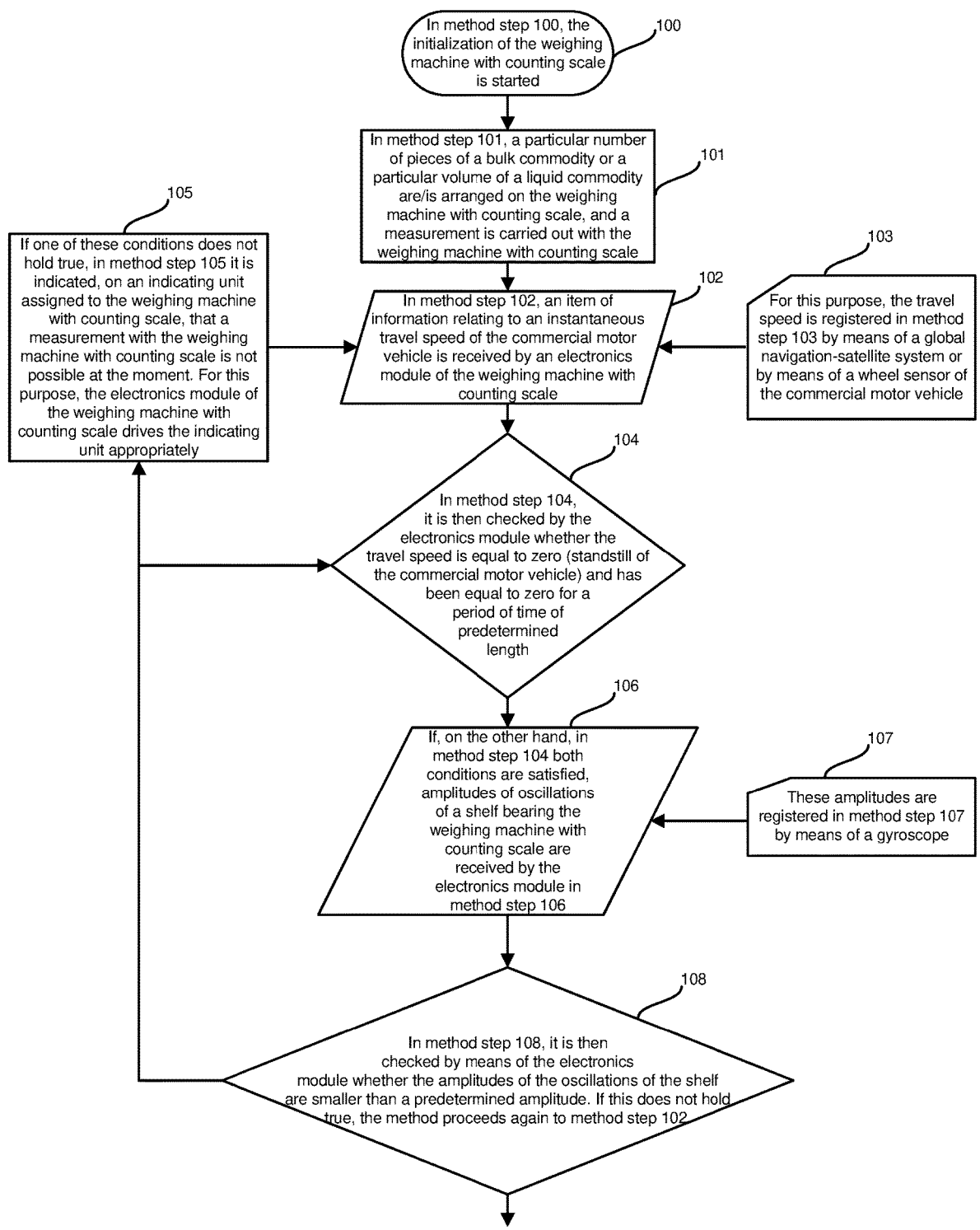
Figure 2:
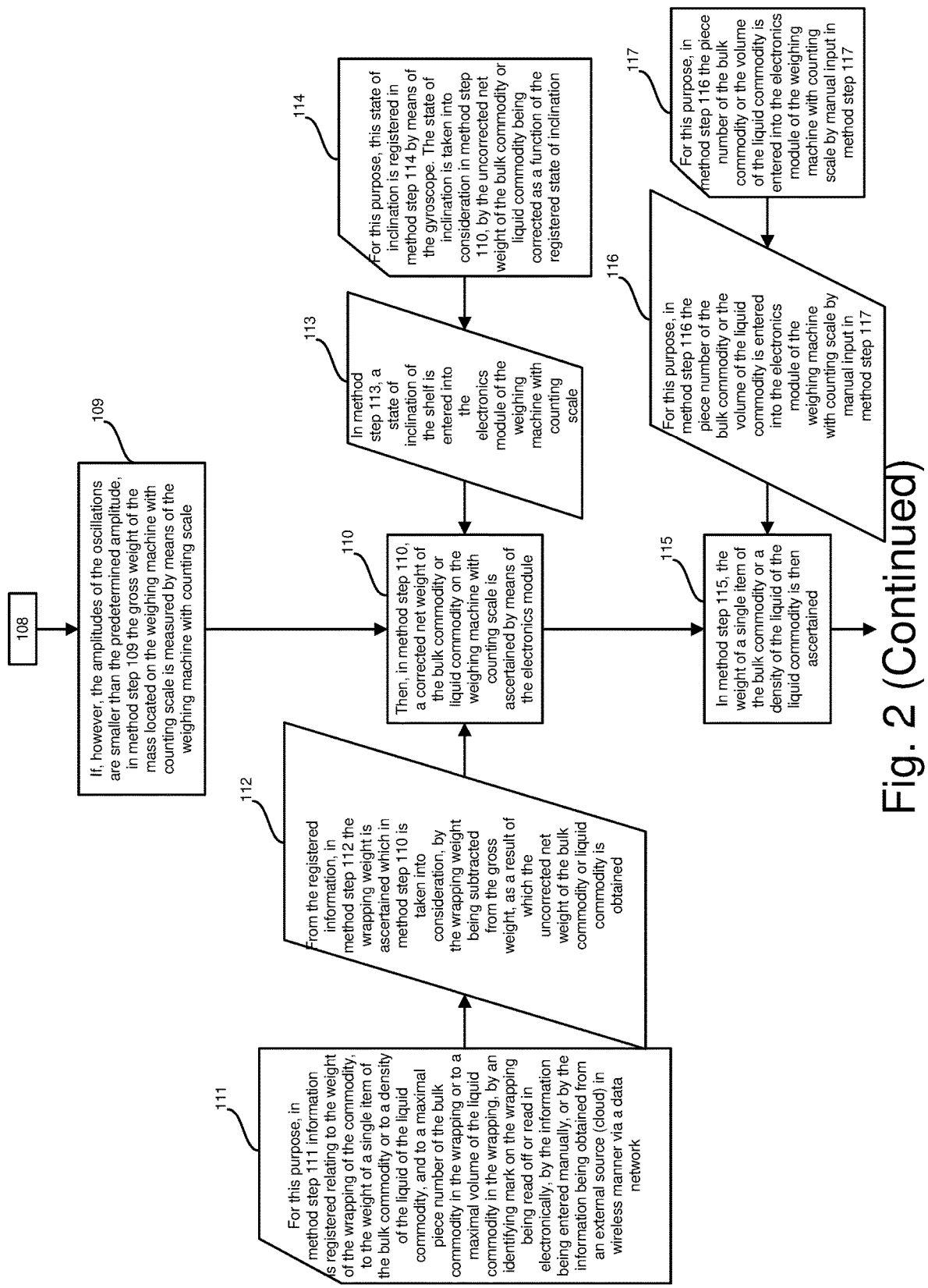

FIG. 2 shows a flowchart of an example of an initialization of a weighing machine with counting scale according to the invention. In method step 100, the initialization of the weighing machine with counting scale is started.

In method step 101, a particular number of pieces of a bulk commodity or a particular volume of a liquid commodity are/is arranged on the weighing machine with counting scale, and a measurement is carried out with the weighing machine with counting scale. In method step 102, an item of information relating to an instantaneous travel speed of the commercial motor vehicle is received by an electronics module of the weighing machine with counting scale. For this purpose, the travel speed is registered in method step 103 by means of a global navigation-satellite system or by means of a wheel sensor of the commercial motor vehicle.

In method step 104, it is then checked by the electronics module whether the travel speed is equal to zero (standstill of the commercial motor vehicle) and has been equal to zero for a period of time of predetermined length. If one of these conditions does not hold true, in method step 105 it is indicated, on an indicating unit assigned to the weighing machine with counting scale, that a measurement with the weighing machine with counting scale is not possible at the moment. For this purpose, the electronics module of the weighing machine with counting scale drives the indicating unit appropriately. The method then proceeds again to method step 102.

If, on the other hand, in method step 104 both conditions are satisfied, amplitudes of oscillations of a shelf bearing the weighing machine with counting scale are received by the electronics module in method step 106. These amplitudes are registered in method step 107 by means of a gyroscope. In method step 108, it is then checked by means of the electronics module whether the amplitudes of the oscillations of the shelf are smaller than a predetermined amplitude. If this does not hold true, the method proceeds again to method step 102. If, however, the amplitudes of the oscillations are smaller than the predetermined amplitude, in method step 109 the gross weight of the mass located on the weighing machine with counting scale is measured by means of the weighing machine with counting scale.

Then, in method step 110, a corrected net weight of the bulk commodity or liquid commodity on the weighing machine with counting scale is ascertained by means of the electronics module. For this purpose, in method step 111 information is registered relating to the weight of the wrapping of the commodity, to the weight of a single item of the bulk commodity or to a density of the liquid of the liquid commodity, and to a maximal piece number of the bulk commodity in the wrapping or to a maximal volume of the liquid commodity in the wrapping, by an identifying mark on the wrapping being read off or read in electronically, by the information being entered manually, or by the information being obtained from an external source (cloud) in wireless manner via a data network. From the registered information, in method step 112 the wrapping weight is ascertained which in method step 110 is taken into consideration, by the wrapping weight being subtracted from the gross weight, as a result of which the uncorrected net weight of the bulk commodity or liquid commodity is obtained.

In method step 113, a state of inclination of the shelf is entered into the electronics module of the weighing machine with counting scale. For this purpose, this state of inclination is registered in method step 114 by means of the gyroscope. The state of inclination is taken into consideration in method step 110, by the uncorrected net weight of the bulk commodity or liquid commodity being corrected as a function of the registered state of inclination.

In method step 115, the weight of a single item of the bulk commodity or a density of the liquid of the liquid commodity is then ascertained. For this purpose, in method step 116 the piece number of the bulk commodity or the volume of the liquid commodity is entered into the electronics module of the weighing machine with counting scale by manual input in method step 117.

In method step 118, the weight of a single item of the bulk commodity or the density of the liquid of the liquid commodity and associated information are stored in an electronic memory of the weighing machine with counting scale and/or in an evaluation-electronics module of the storage system and/or in a computer network (cloud). For this purpose, in method step 119 the maximal piece number of the bulk commodity in the wrapping or the maximal volume of the liquid commodity in the wrapping is entered into the electronics module, this information being registered in method step 120 by electronic reading-off or reading-in of the identifying mark on the wrapping.

In method step 121, the absolute piece number and the relative piece number of the bulk commodity that is present on the weighing machine with counting scale or the absolute amount and the relative amount of the liquid commodity that is present on the weighing machine with counting scale are indicated on the indicating unit assigned to the weighing machine with counting scale. Subsequently this initialization of the weighing machine with counting scale is concluded in method step 122.

Figure 3:
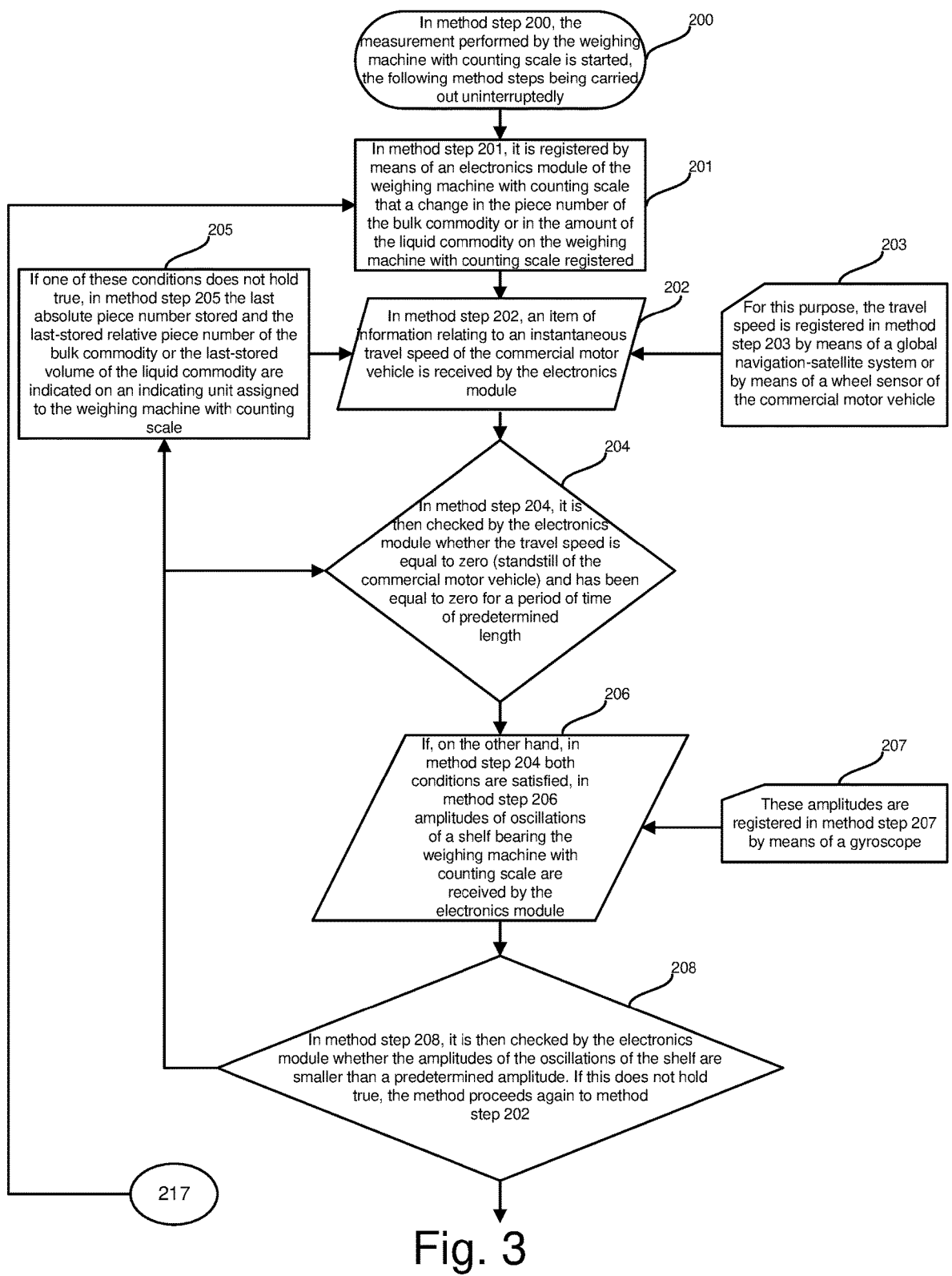
Figure 3:
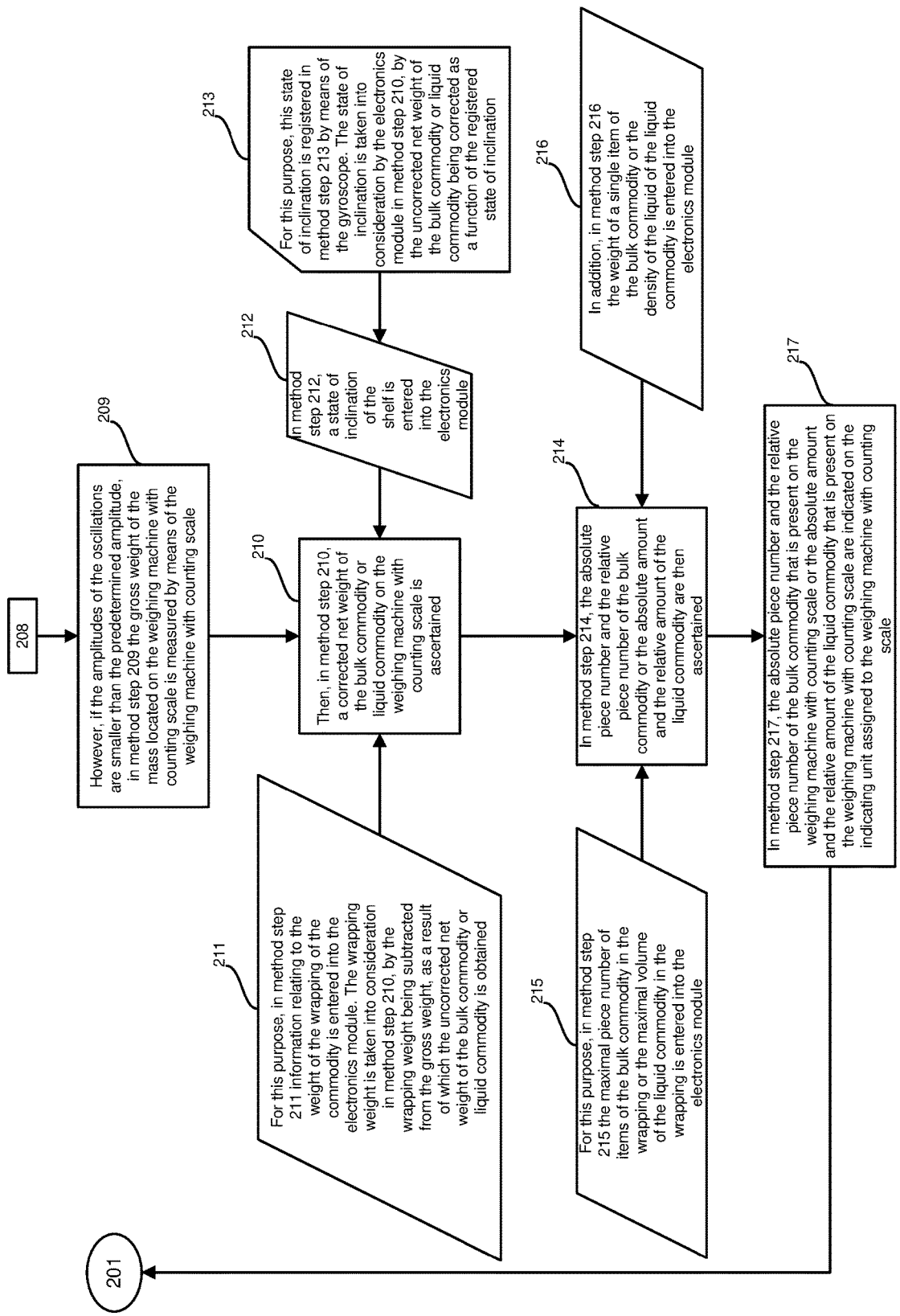

FIG. 3 shows a flowchart of an example of a measurement by means of a weighing machine with counting scale according to the invention. In method step 200, the measurement performed by the weighing machine with counting scale is started, the following method steps being carried out uninterruptedly.

In method step 201, it is registered by means of an electronics module of the weighing machine with counting scale that a change in the piece number of the bulk commodity or in the amount of the liquid commodity on the weighing machine with counting scale registered. In method step 202, an item of information relating to an instantaneous travel speed of the commercial motor vehicle is received by the electronics module.

For this purpose, the travel speed is registered in method step 203 by means of a global navigation-satellite system or by means of a wheel sensor of the commercial motor vehicle.

In method step 204, it is then checked by the electronics module whether the travel speed is equal to zero (standstill of the commercial motor vehicle) and has been equal to zero for a period of time of predetermined length. If one of these conditions does not hold true, in method step 205 the last absolute piece number stored and the last-stored relative piece number of the bulk commodity or the last-stored volume of the liquid commodity are indicated on an indicating unit assigned to the weighing machine with counting scale. The method then proceeds again to method step 202.

If, on the other hand, in method step 204 both conditions are satisfied, in method step 206 amplitudes of oscillations of a shelf bearing the weighing machine with counting scale are received by the electronics module. These amplitudes are registered in method step 207 by means of a gyroscope. In method step 208, it is then checked by the electronics module whether the amplitudes of the oscillations of the shelf are smaller than a predetermined amplitude. If this does not hold true, the method proceeds again to method step 202. However, if the amplitudes of the oscillations are smaller than the predetermined amplitude, in method step 209 the gross weight of the mass located on the weighing machine with counting scale is measured by means of the weighing machine with counting scale.

Then, in method step 210, a corrected net weight of the bulk commodity or liquid commodity on the weighing machine with counting scale is ascertained. For this purpose, in method step 211 information relating to the weight of the wrapping of the commodity is entered into the electronics module. The wrapping weight is taken into consideration in method step 210, by the wrapping weight being subtracted from the gross weight, as a result of which the uncorrected net weight of the bulk commodity or liquid commodity is obtained.

In method step 212, a state of inclination of the shelf is entered into the electronics module. For this purpose, this state of inclination is registered in method step 213 by means of the gyroscope. The state of inclination is taken into consideration by the electronics module in method step 210, by the uncorrected net weight of the bulk commodity or liquid commodity being corrected as a function of the registered state of inclination.

In method step 214, the absolute piece number and the relative piece number of the bulk commodity or the absolute amount and the relative amount of the liquid commodity are then ascertained. For this purpose, in method step 215 the maximal piece number of items of the bulk commodity in the wrapping or the maximal volume of the liquid commodity in the wrapping is entered into the electronics module. In addition, in method step 216 the weight of a single item of the bulk commodity or the density of the liquid of the liquid commodity is entered into the electronics module.

In method step 217, the absolute piece number and the relative piece number of the bulk commodity that is present on the weighing machine with counting scale or the absolute amount and the relative amount of the liquid commodity that is present on the weighing machine with counting scale are indicated on the indicating unit assigned to the weighing machine with counting scale. Subsequently the method proceeds to method step 201.

LIST OF REFERENCE SYMBOLS

1 storage system
2 rack
3 shelf
4 shelf
5 weighing machine with counting scale
6 receiving unit
7 indicating unit
8 central indicating unit
9 gyroscope
100-122 method step
200-217 method step

The invention claimed is:

1. A storage system (1) for a loading space of a commercial motor vehicle, comprising:
   a first plurality of weighing machines and a second plurality of weighing machines each with a counting scale (5) capable of being fixed in the loading space,
   a first plurality of indicating units (7) and a second plurality of indicating units (7) each assigned to a corresponding one of the first plurality of weighing machines and the second plurality of weighing machines for indicating a piece number of a plurality of bulk commodities each located on the corresponding one of the first and second plurality of weighing machines and/or for indicating a volume of a plurality of liquid commodities located on the corresponding one of the first and second plurality of weighing machines,
   a first shelf (3) and a second shelf (4) disposed on top of one another inside the vehicle and being capable of being fixed in the loading space, wherein the first and second shelves are configured such that the first plurality of weighing machines are fixed on the first shelf and the second plurality of weighing machines are fixed on the second shelf, wherein each of the first plurality of indicating units are arranged on the first shelf on one of the first plurality of weighing machines, and wherein each of the second plurality of indicating units are arranged on the second shelf on one of the second plurality of weighing machines, and
   a first and a second plurality of bulk-commodity-receiving and/or liquid-commodity-receiving units (6) each for one of the first and second plurality of weighing machines.

2. The storage system (1) according to claim 1, wherein each of the indicating units (7) takes the form of an e-paper display.

3. The storage system (1) according to claim 1, wherein each of the indicating units comprises a central indicating unit which has been set up to indicate for all of the weighing machines, wherein the system further comprising at least one evaluation-electronics module connected to the weighing machines with the counting scale (5), on the one hand, and to the central indicating unit (8), on the other hand, which has been set up to drive the central indicating unit (8) for the purpose of indicating an information signal assigned to a particular weighing machine with counting scale (5) if by means of this weighing machine with counting scale (5) it has been registered that the corresponding piece number of the bulk commodity or the corresponding volume of the liquid commodity on this weighing machine with counting scale (5) falls short of a predetermined minimum value.

4. The storage system (1) according to claim 3, further comprising at least one microphone connected to the drive electronics for entering voice commands, the drive electronics having been set up to evaluate the voice commands and to drive the indicating unit (7) assigned to the respective weighing machine with counting scale (5) and/or the central indicating unit (8) as a function of voice commands.

5. The storage system (1) according to claim 3, further comprising at least one data interface connected to the drive electronics for wireless communication with a data network.

6. The storage system (1) according to claim 1, wherein each of the first and second pluralities of weighing machines exhibits an electronics module which has been set up to receive and evaluate an item of information relating to an instantaneous travel speed of the commercial motor vehicle, so that a measurement by the weighing machines with counting scale (5) is undertaken only when the commercial motor vehicle has been at a standstill for longer than a period of time of predetermined length.

7. The storage system (1) according to claim 6, further comprising at least one triaxial gyroscope (9) which is capable of being fixed to either of the first and second shelves (3, 4) and which is connected to the electronics module of the respective weighing machine with counting scale (5), the electronics module having been set up to evaluate measurement signals of the gyroscope (9), so that the measurement by means of the respective weighing machine with counting scale (5) is undertaken only when amplitudes of oscillations of the shelf (3, 4) are smaller than a predetermined amplitude.

8. The storage system (1) according to claim 7, wherein the electronics module has been set up to correct a result of the measurement by the respective weighing machine with the counting scale (5) as a function of a state of inclination of the shelf (3, 4) registered by the gyroscope (9).

9. A method for monitoring a piece number of a bulk commodity located in one of a plurality of a-receiving units (6) and/or for monitoring a volume of a liquid commodity located in the one of the plurality of receiving units (6), wherein a first plurality of the receiving units are located on a first shelf in a loading space of a commercial motor vehicle and a second plurality of the receiving units are located on a second shelf in the loading space of the vehicle, the first and second shelves being oriented one on top of the other, the method comprising registering the piece number of the bulk commodity or the volume of the liquid commodity by a weighing machine with a counting scale (5), the weighing machine being one of a plurality of weighing machines with counting scales comprising a first plurality of weighing machines each disposed on the first shelf and a second plurality of weighing machines each disposed on the second shelf, and indicating by a first indicating unit (7) of a plurality of indicating units comprising a first plurality of indicating units and a second plurality of indicating units each assigned to a corresponding one of the first and second pluralities of weighing machines.

10. The method according to claim 9, wherein the piece number of the bulk commodity or the volume of the liquid commodity is indicated additionally by a central indicating unit (8) which piece numbers of bulk commodities and/or volumes of liquid commodities are indicated simultaneously for several weighing machines with counting scale (5).

11. The method according to claim 9, wherein an information signal assigned to a particular weighing machine with the counting scale (5) is indicated by means of one of the indicating units (7) and/or the central indicating unit (8) if by means of this weighing machine with counting scale (5) it has been registered that the piece number of the bulk commodity or the volume of the liquid commodity on this weighing machine with counting scale (5) falls short of a predetermined minimum value.

12. The method according to claim 10, wherein the indicating unit (7) assigned to the respective weighing machine with the counting scale (5) and/or the central indicating unit (8) is/are driven as a function of voice commands.

13. The method according to claim 9, wherein results of measurements by the weighing machines with counting scale (5) are communicated to a computer network in wireless manner via a data network.

14. The method according to claim 9, wherein the measurement by each of the weighing machines with the counting scale (5) is undertaken only when a sensor registers that the commercial motor vehicle has been at a standstill for longer than a period of time of predetermined length.

15. The method according to claim 9, wherein the measurement by each of the weighing machines with the counting scale (5) is undertaken only when a sensor registers that amplitudes of oscillations of one of the first and second shelves bearing the weighing machines with the counting scale (5) are smaller than a predetermined amplitude.

16. The method according to claim 15, wherein a result of the measurement by the weighing machines with the counting scale (5) is corrected as a function of a state of inclination of one of the shelves registered by the sensor.

17. The system according to claim 1, wherein the commercial motor vehicle is a delivery truck.

* * * * *